United States Patent [19]

Morimoto et al.

[11] 3,815,436

[45] June 11, 1974

[54] AUTOMOTIVE TRANSMISSION GEAR SHIFTING MECHANISM

[75] Inventors: Yoshiro Morimoto; Kunihiko Suzuki, both of Yokohama, Japan

[73] Assignee: Nissan Motor Company, Limited, Yokohama, Japan

[22] Filed: Mar. 2, 1973

[21] Appl. No.: 337,449

[30] Foreign Application Priority Data
Mar. 4, 1972  Japan.............................. 47-26620

[52] U.S. Cl...................... 74/476, 74/473 P, 74/526
[51] Int. Cl............................................. F16h 57/06
[58] Field of Search....... 74/476, 473 P, 473 R, 526

[56] References Cited
UNITED STATES PATENTS
3,417,634  12/1968  Dangauthier.......................... 74/473
3,597,992  8/1971  Lowry et al............................ 74/476
3,656,365  4/1972  Kussmann.......................... 74/473 P

*Primary Examiner*—Samuel Scott
*Assistant Examiner*—F. D. Shoemaker

[57] ABSTRACT

To prevent erroneous or accidental movement of a gear-shift lever to a position effecting shifting into reverse in a manually operated automotive power transmission system, the gear-shift lever is rotatable about its axis and urged to turn about the axis to a predetermined angular position in which the gear-shift lever is prevented from being moved to a position effecting the shifting into reverse even though the lever has been moved to a position selecting the reverse gear. The reverse gear is moved to an operative position only when the gear-shift lever is rotated about its axis from the predetermined angular position and further moved to a position moving the reverse gear to the operative position.

8 Claims, 3 Drawing Figures

PATENTED JUN 11 1974
3,815,436
SHEET 2 OF 2

3,815,436

AUTOMOTIVE TRANSMISSION GEAR SHIFTING MECHANISM

The present invention relates to automotive power transmission systems and more particularly to gear shifting mechanisms of manually operated power transmission systems of motor vehicles. The gear shifting mechanism to which the present invention is directed is specifically of the character that uses a gear-shift lever which is manually operated so as to change gears in a transmission gear box through a striking rod which is driven from the gear-shift lever through a rocking lever and which is drivingly connected to gear-shift members such as gear change forks and arms respectively associated with the gears.

The gear shifting mechanisms of the manually operated power transmission systems are generally provided with arrangements which are adapted to prevent erroneous or accidental movement of the gear-shift levers to positions effective to shift the gears to reverse positions when drivers are manipulating the gear-shift levers for selecting forward drive gears in the power transmission systems. Such arrangements are operative to prevent the gears from being moved to the reverse positions unless the gear-shift levers are raised or lowered in axial directions or moved in predetermined directions against actions of preload springs. Drawbacks are thus encountered in the gear shifting mechanisms using the arrangements of this nature due to considerably intricate manipulatory steps and disproportionately large amounts of human efforts required of the drivers. The present invention contemplates elimination of these and other drawbacks of the prior art gear shifting mechanisms of the manually operated power transmission systems.

It is accordingly a principal object of the present invention to provide an improved gear shifting mechanism of the manually operated power transmission system of a motor vehicle providing utmost ease of manipulation with a minimum of human effort in shifting the gears in the transmission gear box to the reverse position.

It is another object of the present invention to provide an improved power transmission gear shifting mechanism which has a simple construction and which can readily be produced at a minimum of cost.

These objects of the present invention will be accomplished basically through an improvement which comprises a gear-shift lever which is rotatable about its axis, a stop member which is fast on the transmission casing, the gear-shift lever having a portion which is engageable with the stop member when the lever is moved to a position selecting a reverse gear, and resilient biasing means for urging the gear-shift lever to turn about its axis to a predetermined angular position to cause the portion of the gear-shift lever to engage the stop member for thereby preventing the lever to be moved to a position to move the reverse gear to an operative position when or even though the gear-shift lever is moved to the position selecting the reverse gear. The reverse gear is moved to the operative position when the gear-shift lever which has been moved to the position selecting the reverse gear is rotated about its axis and thus brought out of the aforesaid predetermined angular position against the action of the resilient biasing means and further moved to a predetermined position to move the reverse gear to the operative position. In a preferred embodiment of the gear-shifting mechanism thus constructed, the gear-shift lever may be formed with an axial bore and received through the axial bore on a shaft which is fast on the rocking lever of the gear shifting mechanism in a manner to be rotatable about an axis of the shaft. In this instance, it is preferable that means be provided so as to prevent lengthwise movement of the gear-shift lever relative to the shaft carrying the lever. Such means may comprise at least one retaining member which is fast on the gear-shift lever and slidably received in a substantially circumferential groove which is formed in the peripheral wall of the shaft.

The nature and advantages of the gear shifting mechanism according to the present invention will become more apparent from the following description taken in conjunction with the accompanying drawings in which.

Figure 1:
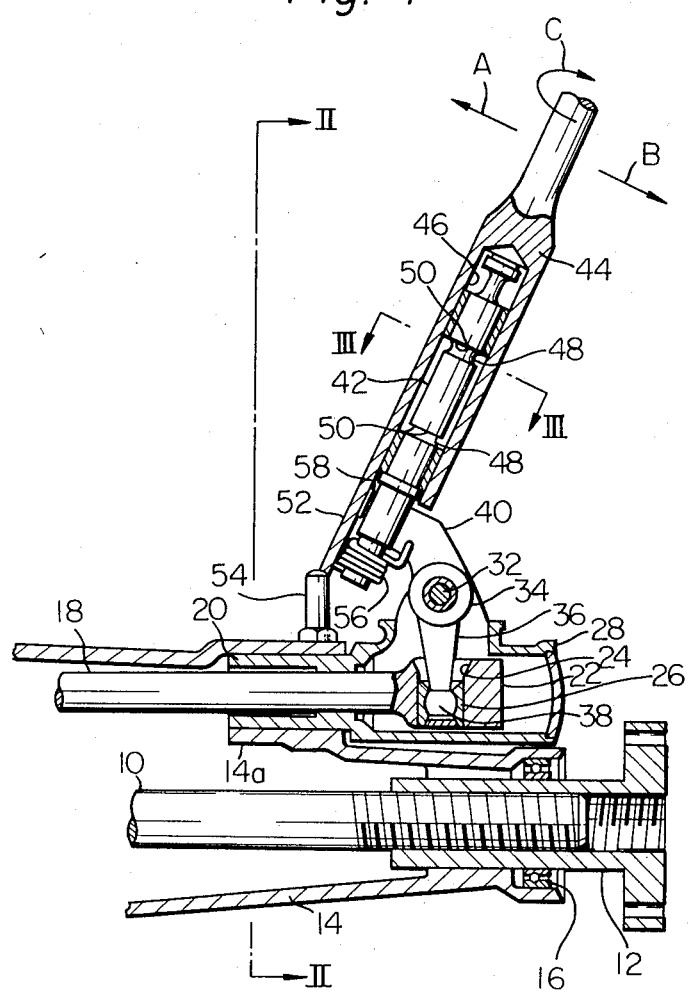
FIG. 1 is a fragmentary sectional view of the preferred embodiment of the gear shifting mechanism according to the present invention.

Referring now to the drawings, and first to FIG. 1, the gear shifting mechanism according to the present invention is intended to be incorporated in the manually operated power transmission system which in itself is well known in the art. The transmission system thus has, as customary, a transmission main shaft 10 which is rotatably received in a bushing 12 supported on an extension 14 of a transmisiion casing through an oil seal 16. The main shaft 10 connects an input shaft of the transmission system to a propeller shaft through gear trains and carries thereon axially spaced gears meshing with gears on a counter shaft, though not shown.

The gear shifting mechanism includes a striking rod 18 extending substantially parallel to the transmission main shaft 10 which rod is axially slidably received in a tubular guide member 20 which in turn is received in a bushed cylindrical guide portion 14a of the extension 14 of the transmission casing. The guide member 20 is rotatable with the striking rod 18 about the axis of the rod. The striking rod 18 is drivingly connected to suitable gear-shift members such as shift forks and arms (not shown) which are respectively associated with the gears on the transmission main shaft 10. The striking rod 18 projects outwardly of the extension 14 of the transmission casing and carries or has formed at its leading end portion a socket portion 22 having a guide hole 24 which is formed substantially diametrically of the socket portion. A slider 26 having a substantially spherical chamber therein is axially slidably received in the guide hole 24. The leading end portion of the striking rod 18 having the socket portion 22 thus constructed is enclosed within a hollow extension 28 of the guide member 20. The extension 28 of the guide member 20 is formed with a chamber which is so sized as to accommodate the full strokes of the socket portion 22 brought about as the striking rod 18 is axially moved through the guide member 20. The extension 28 of the guide member 20 has spaced upper side walls 30 and 30' (FIG. 2) which carry a pivotal shaft 32 extending in a direction substantially transverse to the direction of the axis of the striking rod 18 and positioned over and substantially in alignment with the spherical chamber in the slider 26 in the socket portion 22, as better seen in FIG. 2. A rocking lever 34 is supported on the pivotal shaft 32 and is rotatable about an axis of the pivotal shaft, viz., in a plane passing through the axis of the striking rod 18. The rocker lever 34 has a lower arm 36 which is formed with a substantially spherical end portion 38. This spherical end portion 38 is slidably received in the spherical chamber in the slider 26 which is located below and substantially in alignment with the pivotal shaft 32. The rocking motion of the rocking lever 34 about the pivotal shaft 32 thus brings about an axial movement of the striking rod 18 through the tubular guide member 20. The rocking lever 34 is also rockable together with the pivotal shaft 32 and the guide member 20 about the striking rod 18 and such a rocking motion brings about rotation of the striking rod 18 about its axis. The rocking motion of the lever 34 about the axis of the striking rod 18 is intended to select a gear to be moved on the transmission main shaft 10 to an operative position while the rocking motion of the lever 34 about the pivotal shaft 32 is intended to move the selected gear to the operative position. The rocking lever 34 has an upper arm 40 extending opposite to the lower arm 36. The upper arm 40 carries at its upper end a shaft 42 which is rockable with the rocking lever 34 about the striking rod 18 and about the pivotal shaft 32. The shaft 42 receives thereon a gear-shift lever 44 in an axial bore 46 formed in the lever so that the lever is rotatable about an axis of the shaft 42. The gear-shift lever 44 is prevented from being moved axially on the shaft 42 by suitable retaining means which may comprise, as illustrated in FIGS. 1 and 3, a suitable number of pins 48 which are tightly received in holes formed in the gear-shift lever 44 and slidably received in spaced circumferential grooves 50 which are formed in the peripheral wall of the shaft 42. The gear-shift lever 44 is in this manner permitted to turn about its axis relative to the shaft 42 through sliding engagement between the pins 48 and shaft 42 and locked in the axial direction through locking engagement between the pins 48 and the circumferential grooves 50 in the shaft 42. The gear-shift lever 44 has a downward extension 52 which terminates over and at a spacing from the upper wall of the extension 14 of the transmission casing. To the upper wall of the transmission case extension 14 is secured a substantially rigid stop member 54 which is located in the neighbourhood of the downward extension 52 of the gear-shift lever 44. A suitable resilient biasing means such as a helical torsion spring 56 is mounted on a lower end portion of the shaft 42, having one end received on the upper arm 40 of the rocking lever 34 and the other end received on one lengthwise edge of the extension 52 of the gear-shift lever 44 for urging the lever 44 to turn in one direction about the axis of the shaft 42. A stop member 58 is secured to the shaft 42 in a manner to be engageable with the other lengthwise edge of the extension 52 of the gear-shift lever 44 so that the turning motion of the gear-shift lever 44 resulting from an action of the helical torsion spring 56 is stopped by the stop member 58. It is, in this instance, important that the gear-shift lever 44 thus urged by the torsion spring 56 to turn about its axis is stopped by the stop member 58 in a position in which the extension 52 is aligned with the stop member 54 on the transmission case extension 14 when the lever 44 and accordingly the shaft 42 and rocking lever 34 are turned about the axis of the striking rod 18 to a predetermined angular position selecting the reverse gear in the transmission as indicated by solid lines in FIG. 2 and held out of alignment with the stop member 54 when the gear-shift lever 44 and the members movable therewith are in positions other than the reverse gear selecting position such as a neutral position which is indicated by phantom lines in FIG. 2.

The operation of the gear shifting mechanism having the construction above described will now be explained with concurrent reference to FIGS. 1 and 2.

Figure 2:
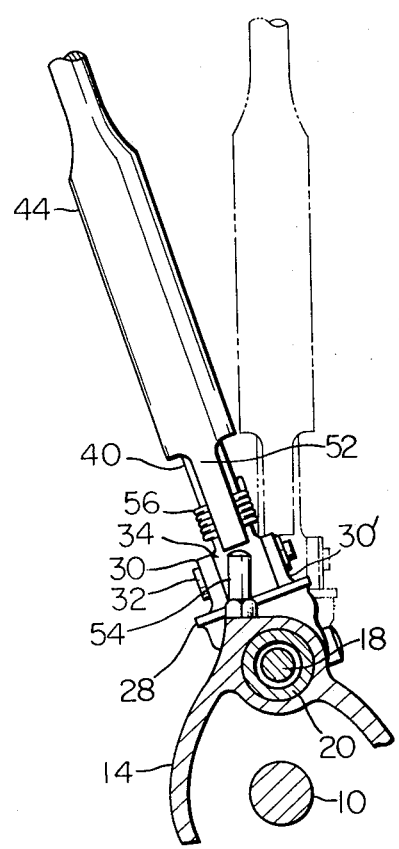
FIG. 2 is a cross sectional view of the gear shifting mechanism as taken on line II—II of FIG. 1.
Figure 3:
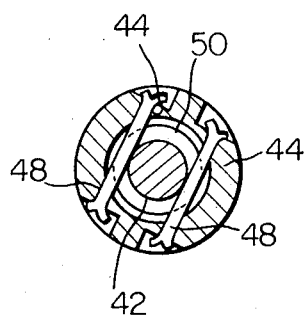
FIG. 3 is a cross section taken on line III—III of FIG. 1.

When the gear-shift lever 44 is held in the neutral position indicated by phantom lines in FIG. 2 or moved to any position off the reverse gear selecting position which is indicated by full lines, the downward extension 52 of the gear-shift lever 44 is maintained out of alignment with the stop member 54 on the extension 14 of the transmission casing so that the lever 44 can be freely turned about the pivotal shaft 32 forwardly and backwardly as indicated by arrows A and B respectively in FIG. 1 for effecting shifting between the forward drive positions in the transmission system. If, then, the gear-shift lever 44 is turned about the axis of the striking rod 18 to the reverse gear selecting position indicated by the solid lines in FIG. 2, the extension 52 of the gear-shift lever 44 becomes engageable with the stop member 54 on the transmission case extension 14. Under this condition, the gear-shift lever 44 is prevented from being turned about the pivotal shaft 32 in the direction of arrow A through an end-to-end abutment of the extension 52 of the lever 44 on the stop member 54 with the result that the reverse gear can not be moved to its operative position insofar as the gear-shift lever 44 is maintained in the particular angular position by the action of the torsion spring 56. To move the reverse gear to the operative position, the gear-shift lever 44 which has been turned to the reverse gear selecting position shown by the solid lines in FIG. 2 should be turned about its axis against the action of the torsion spring 56 as indicated by an arrowhead C in FIG. 1 so that the extension 52 of the gear-shift lever 44 is brought out of engagement with the stop member 54 on the transmission case extension 14. The gear-shift lever 44 is now releaved of the interference of the stop member 54 and is consequently permitted to be turned forward in the direction of arrow A in FIG. 1 for causing the striking rod 18 to axially slide through the guide member 20 move the reverse gear to the operative position. It is apparent that the gear-shift lever 44 turned to the reverse gear selector position indicated by the solid lines in FIG. 2 can be turned backwardly about the pivotal shaft 42 in the direction of arrow B in FIG. 1 without being subjected to interference for selecting a predetermined forward drive position in the transmission system.

It will now be appreciated from the foregoing description that not only the erroneous or accidental shifting into reverse can be avoided with certainty through provision of the extension 52 of the gear-shift lever 44 and the stop member 54 on the transmission case extension 14 but the shifting into reverse can be effected in simple and streamlined manipulatory steps with a minimum of human effort in the gear shifting mechanism according to the present invention.

What is claimed is:

1. In a gear shifting mechanism of an automotive power transmission system including a gear-shift lever, manually operated to change gears in the transmission system through a striking rod driven by the gear-shift lever through a rocking lever and drivingly connected to gear shifting members corresponding to respective gears, the improvement comprises the gear-shift lever being arranged rotatably about its axis, a stop member fast on a transmission casing, said gear-shift lever having a portion which is engageable with said stop member when the lever is moved to a position selecting a reverse gear, and resilient biasing means for urging the gear-shift lever to turn about its axis to a predetermined angular position to cause said portion of the gear-shift lever to engage said stop member for preventing the gear-shift lever from being moved to a position to move the reverse gear to an operative position when the lever is moved to said position selecting the reverse gear, the reverse gear being moved to the operative position when the gear-shift lever which has been moved to said position selecting the reverse gear is rotated about its axis out of said predetermined angular position against the action of said resilient biasing means and further moved to a position predetermined to move the reverse gear to the operative position.

2. In a gear shifting mechanism of an automotive power transmission system including a gear-shift lever, manually operated to change gears in the transmission system through a striking rod which is driven by the gear-shift lever through a rocking lever and which is drivingly connected to gear shifting members corresponding to respective gears, the improvement comprises a shaft which is fast on the rocking lever, the gear-shift lever being arranged to form an axial bore therein and received on said shaft through the axial bore, said gear-shift lever being rotatable about the axis of said shaft within said axial bore, a stop member which is fast on a transmission casing, the gear-shift lever having a portion which is engageable with said stop member when the lever is moved to a position selecting a reverse gear, and resilient biasing means for urging the gear-shift lever to turn about its axis to a predetermined angular position to cause said portion of the gear-shift lever to engage with said stop member for preventing the gear-shift lever from being moved to a position to move the reverse gear to an operative position when the lever is moved to said position selecting the reverse gear, the reverse gear being moved to the operative position when the gear-shift lever which has been moved to said position selecting the reverse gear is rotated about its axis around said shaft and brought out of said predetermined angular position against the action of said resilient biasing means and further moved to a position which is predetermined to move the reverse gear to the operative position.

3. In a gear shifting mechanism of an automotive power transmission system including a gear-shift lever which is manually operated to change gears in the transmission system through a striking rod which is driven from the gear-shift lever through a rocking lever and which is drivingly connected to gear-shifting members corresponding to respective gears, the improvement comprises a shaft which is fast on said rocking lever, and which is formed with at least one circumferential groove, the gear-shift lever being arranged to form an axial bore therein and received on said shaft through said axial bore, at least one retaining member which is fast on said gear-shift lever and which is slidably received in said circumferential groove in said shaft for permitting the gear-shift lever to turn about its axis and around said shaft and preventing the gear-shift lever from moving axially of said shaft, a stop member which is fast on a transmission casing, the gear-shift lever having a portion which is engageable with said stop member when the lever is moved to a position selecting a reverse gear, and resilient biasing means for urging said gear-shift lever to turn about its axis to a predetermined angular position for causing said portion of the gear-shift lever to engage with said stop member to prevent the gear-shift lever from being moved to a position to move the reverse gear to an operative position when the lever is turned to said position selecting the reverse gear, the reverse gear being moved to the operative position when the gear-shift lever which has been turned to said position selecting the reverse gear is rotated about its axis around said shaft and brought out of said predetermined angular position against the action of said resilient biasing means and further moved to a position which is predetermined to move the reverse gear to the operative position.

4. A gear shifting mechanism of an automotive power transmission system, comprising a striking rod which is axially slidably pivoted in a transmission casing and which is drivingly connected to gear shifting members corresponding to respective gears in the transmission system, a rocking lever which is rotatable with said striking rod about an axis of the rod for selecting a gear to be moved to an operative position and which is rockable about an axis which is substantially transverse to the axis of said striking rod for axially moving the striking rod relative to the transmission casing to move the selected gear to the operative position, a gear-shift lever rotatable about its axis and rockable with said rocking lever about the axis of the striking rod, a stop member which is fast on the transmission casing, the gear-shift lever having a portion which is engageable with said stop member when the gear-shift lever is turned with the rocking lever about the axis of the striking rod to a position selecting a reverse gear, and resilient biasing means urging the gear-shift lever to turn about its axis to a predetermined angular position in which said portion of the gear-shift lever is engageable with said stop member for preventing the gear-shift lever from being moved to a position to move the reverse gear to an operative position when the gear-shift lever is turned about the axis of said striking rod to said position selecting the reverse gear, the reverse gear being moved to the operative position when the gear-shift lever which has been rotated with said rocking lever about the axis of the striking rod to said position selecting the reverse gear is rotated about its axis out of said predetermined angular position against the action of said resilient biasing means and further moved to a position which is predetermined to move the reverse gear to the operative position.

5. A gear shifting mechanism as claimed in claim 4, further comprising a shaft which is fast on said rocking lever and carrying said gear-shift lever through an axial bore which is formed in the gear-shift lever.

6. A gear shifting mechanism as claimed in claim 5, further comprising means operative to prevent said gear-shift lever from moving axially of the shaft and permit the gear-shift lever to rotate about its axis around said shaft.

7. A gear shifting mechanism as claimed in claim 6, in which said means comprises at least one retaining member which is fast on said gear-shift lever and which is slidably received in a circumferential groove formed in a peripheral wall of said shaft.

8. A gear shifting mechanism as claimed in claim 4, in which said resilient biasing means comprises a torsion spring which is supported on said rocking lever and said portion of said gear-shift lever; and a stop member which is secured to said shaft and which is located to stop the gear-shift lever in said predetermined angular position.

* * * * *